(12) United States Patent
Ishida et al.

(10) Patent No.: US 12,508,908 B2
(45) Date of Patent: Dec. 30, 2025

(54) INFORMATION PROCESSING SYSTEM

(71) Applicant: HONDA MOTOR CO., LTD., Tokyo (JP)

(72) Inventors: Yusuke Ishida, Tokyo (JP); Junichiro Onaka, Tokyo (JP); Kenta Maruyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 176 days.

(21) Appl. No.: 18/244,384

(22) Filed: Sep. 11, 2023

(65) Prior Publication Data

US 2024/0083249 A1    Mar. 14, 2024

(30) Foreign Application Priority Data

Sep. 12, 2022   (JP) ................................. 2022-144362

(51) Int. Cl.
*B60K 35/65*   (2024.01)
*G02B 27/01*   (2006.01)
(Continued)

(52) U.S. Cl.
CPC ............ *B60K 35/65* (2024.01); *G02B 27/017* (2013.01); *B60K 35/10* (2024.01); *B60K 35/23* (2024.01);
(Continued)

(58) Field of Classification Search
None
See application file for complete search history.

(56) References Cited

U.S. PATENT DOCUMENTS 8,937,591 B2 *   1/2015   Julian ................. G06F 3/04812
                                                        351/203
11,675,430 B1 *   6/2023   Peuhkurinen ............ G06F 3/14
                                                        345/156
(Continued)

FOREIGN PATENT DOCUMENTS

JP     2020-094958    6/2020
JP     2020-177347    10/2020
WO     2018/230563    12/2018

OTHER PUBLICATIONS

Japanese Office Action for Japanese Patent Application No. 2022-144362 mailed Jun. 4, 2024.

*Primary Examiner* — Justin S Lee
(74) *Attorney, Agent, or Firm* — Amin, Turocy & Watson, LLP (57) ABSTRACT

An information processing system includes a first device that is mounted in a mobile object which an occupant boards and a second device that is used by a user at a place different from the mobile object. The first device includes a first communication device configured to communicate with a second communication device of the second device and a camera unit including one or more cameras. The second device includes the second communication device configured to communicate with the first communication device, a detection device configured to detect an orientation direction of the user, and a display device configured to display an image corresponding to the orientation direction when seen from the predetermined seat out of images captured by the camera unit. The second device identifies a sight area to which a sightline of the user is directed in the image, and the first device displays the sight area received via the first communication device in a predetermined mode on a display device.

9 Claims, 11 Drawing Sheets

(51) Int. Cl.
*B60K 35/10* (2024.01)
*B60K 35/23* (2024.01)
*B60K 35/28* (2024.01)

(52) U.S. Cl.
CPC ........ *B60K 35/28* (2024.01); *B60K 2360/149* (2024.01); *B60K 2360/176* (2024.01); *B60K 2360/21* (2024.01)

(56) References Cited

U.S. PATENT DOCUMENTS

| | | | |
|---|---|---|---|
| 2014/0062853 A1* | 3/2014 | Chaudhri | G06F 3/013 |
| | | | 345/156 |
| 2019/0243355 A1* | 8/2019 | Izu | H04N 23/698 |
| 2019/0355178 A1 | 11/2019 | Hermina Martinez et al. | |
| 2020/0159014 A1 | 5/2020 | Yasui et al. | |
| 2021/0191510 A1* | 6/2021 | Yoshikawa | G06V 40/19 |
| 2021/0314525 A1 | 10/2021 | Raduchel | |
| 2022/0134881 A1* | 5/2022 | Wickman | G06T 19/006 |
| | | | 701/36 |
| 2022/0202515 A1* | 6/2022 | Itkowitz | G06F 3/012 |
| 2023/0071037 A1* | 3/2023 | Kim | G06F 3/04886 |

\* cited by examiner

INFORMATION PROCESSING SYSTEM

CROSS-REFERENCE TO RELATED APPLICATION

Priority is claimed on Japanese Patent Application No. 2022-144362, filed Sep. 12, 2022, the content of which is incorporated herein by reference.

BACKGROUND

Field of the Invention

The present invention relates to an information processing system.

Description of Related Art

In the related art, study about sharing an image of an outside view or the like through communication between a device mounted in a mobile object such as a vehicle and a device used at a place different from the mobile object has been carried out (Japanese Unexamined Patent Application, First Publication No. 2020-94958).

In the related art, both an occupant in a mobile object and a user located at a place different from the mobile object may not satisfactorily feel a sense of realism.

SUMMARY

The present invention was made in consideration of the aforementioned circumstances and an objective thereof is to provide an information processing system that can enhance a sense of realism which is given to both an occupant in a mobile object and a user located at a place different from the mobile object.

An information processing system according to the present invention employs the following configurations.

(1) According to an aspect of the present invention, there is provided an information processing system including a first device that is mounted in a mobile object which an occupant boards and a second device that is used by a user at a place different from the mobile object, wherein the first device includes: a first communication device configured to communicate with a second communication device of the second device; and a camera unit including one or more cameras including at least an inside camera that is provided on a predetermined seat of the mobile object and images the inside of the mobile object when seen from the predetermined seat, the second device includes: the second communication device configured to communicate with the first communication device; a detection device configured to detect an orientation direction of the user; and a display device configured to display an image corresponding to the orientation direction when seen from the predetermined seat out of images captured by the camera unit, the second device identifies a sight area to which a sightline of the user is directed in the image, the second communication device transmits the identified sight area to the first communication device, and the first device displays the sight area received via the first communication device in a predetermined mode on a display device.

(2) In the aspect of (1), the display device of the first device may include a plurality of indicators, and the first device may turn on at least one of the plurality of indicators corresponding to a direction of the sight area in the image as the predetermined mode.

(3) In the aspect of (1), the display device of the first device may include a display, and the first device may display the sight area on the display as the predetermined mode.

(4) In the aspect of (1), the display device of the first device may include a plurality of indicators and a display, and the first device may switch the predetermined mode between a mode in which at least one of the plurality of indicators corresponding to a direction of the sight area in the image is turned on and a mode in which the sight area is displayed on the display according to the occupant's operation.

(5) In the aspect of (1), the display device of the first device may include a plurality of indicators and a display, and the first device may switch the predetermined mode between a mode in which at least one of the plurality of indicators corresponding to a direction of the sight area in the image is turned on and a mode in which the sight area is displayed on the display on the basis of a predetermined condition.

(6) In the aspect of (5), the predetermined condition may be that an object is present within a predetermined distance from the mobile object, and the first device may set the predetermined mode to the mode in which the sight area is displayed on the display when the predetermined condition has been satisfied.

(7) In the aspect of (1), the second communication device may transmit information of the orientation direction to the first communication device, the first device may further include a first control device configured to control the first communication device such that an image corresponding to the orientation direction acquired via the first communication device out of images captured by the camera unit is selectively transmitted to the second communication device, and the display device of the second device may display an image corresponding to the orientation direction when seen from the predetermined seat and acquired via the second communication device.

(8) In the aspect of (1), the first communication device may transmit images captured by the camera unit to the second communication device, and the second device may further include a second control device configured to selectively display an image corresponding to the orientation direction out of the images captured by the camera unit on the display device.

(9) In the aspect of (1), the display device may be a display device of a virtual reality (VR) goggle, and the detection device may include a physical sensor attached to the VR goggle.

(10) In the aspect of (1), the mobile object may be a vehicle, and the predetermined seat may be a passenger's seat.

According to the aspects of (1) to (10), it is possible to enhance a sense of realism which is given to both an occupant in a mobile object and a user located at a place different from the mobile object.

DESCRIPTION OF EMBODIMENTS

Hereinafter, an information processing system according to an embodiment of the present invention will be described with reference to the accompanying drawings. The information processing system includes a first device that is mounted in a mobile object which an occupant boards and a second device that is used by a user at a place different from the mobile object. The mobile object is, for example, a vehicle but may be any mobile object as long as an occupant can board it. The occupant is mainly a driver of the mobile object, but may be an occupant other than the driver.

Voice collected by microphones is transmitted between the first device and the second device and is reproduced by speakers, which is a state as if a telephone call is carried out. A part of an image captured by a camera unit of the first device is displayed by the second device, whereby mixed reality (MR) is provided to the second device. The first device and the second device do not have to be in a one-to-one relationship, and one of a plurality of first devices and a plurality of second devices may be matched in a one-to-multiple relationship and operate as an information processing system. In the latter, for example, one occupant can be made to communicate simultaneously or sequentially with a plurality of users.

Basic Configuration

Figure 1:
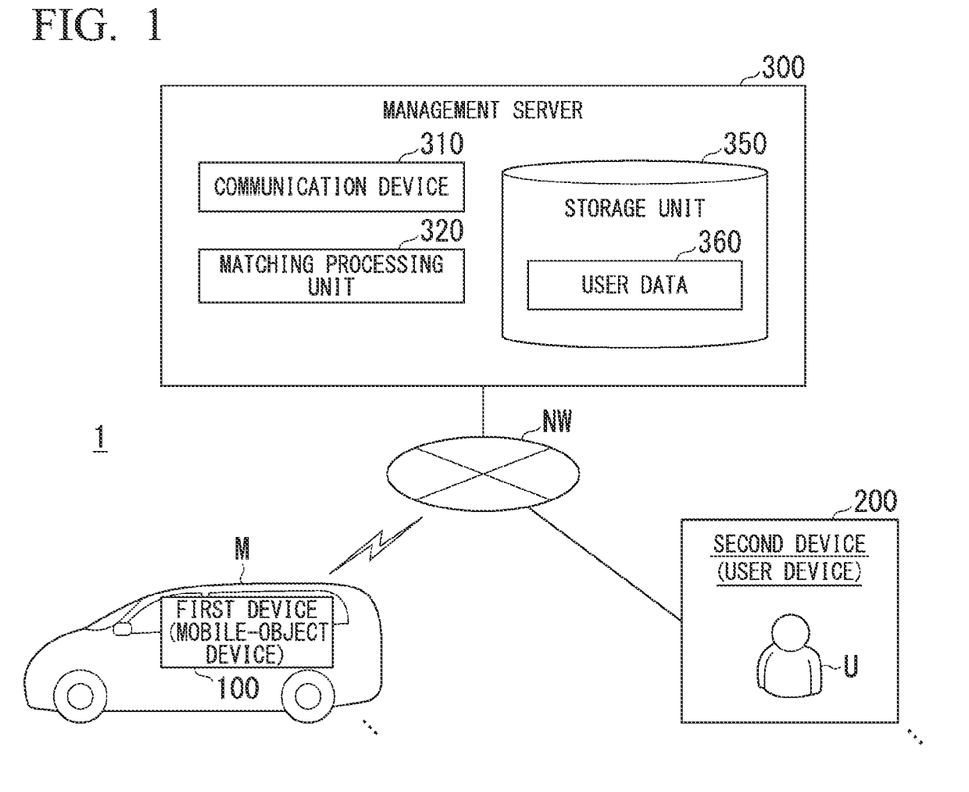
FIG. 1 is a diagram illustrating a usage environment or the like of an information processing system and a management server.

FIG. 1 is a diagram illustrating a usage environment or the like of an information processing system 1 and a management server 300. The information processing system 1 includes a first device (a mobile-object device) 100 that is mounted in a mobile object M and a second device (a user device) 200 that is used by a user U at a place different from the mobile object M (a place accidentally close thereto is not excluded). The first device 100, the second device 200, and the management server 300 communicate with each other via a network NW. The information processing system 1 may include the management server 300 or may not include the management server 300.

The management server 300 includes, for example, a communication device 310, a matching processing unit 320, and a storage unit 350. User data 360 is stored in the storage unit 350.

The communication device 310 is a communication interface for connection to the network NW. Communication between the communication device 310 and the first device 100 and communication between the communication device 310 and the second device 200 are performed, for example, on the basis of the Transmission Control Protocol/Internet Protocol (TCP/IP).

The matching processing unit 320 is realized, for example, by causing a processor such as a central processing unit (CPU) to execute a program (an instruction group) stored in a storage medium. The storage unit 350 includes a random access memory (RAM), a hard disk drive (HDD), and a flash memory.

Figure 2:
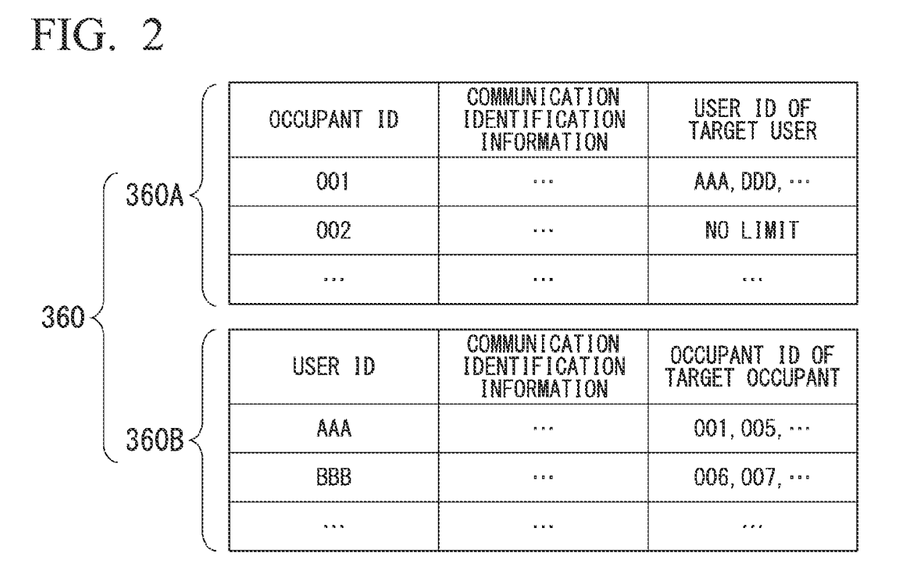
FIG. 2 is a diagram illustrating an example of details of user data.

FIG. 2 is a diagram illustrating an example of details of the user data 360. The user data 360 includes, for example, an occupant list 360A in which an occupant ID which is identification information of an occupant P, communication identification information (such as an IP address) thereof, and a user ID which is identification information of a user U as a matching target are correlated and a user list 360B in which the user ID, communication identification information (such as an IP address) thereof, and an occupant P as a matching target are correlated. The user data 360 is not limited to the mode illustrated in FIG. 2 and may be generated in any mode as long as it includes such information.

When a matching request from a user U via the second device 200 or a matching request from an occupant P via the first device 100 is received by the communication device 310, the matching processing unit 320 performs matching of the user U and the occupant P with reference to the user data 360, transmits the communication identification information of the first device 100 of the occupant P to the second device 200 of the matched user U via the communication device 310, and transmits the communication identification information of the second device 200 of the user U to the first device 100 of the matched occupant P via the communication device 310. The first device 100 and the second device 200 having received the communication identification information performs communication in higher real time, for example, based on a user datagram protocol (UDP).

Figure 3:
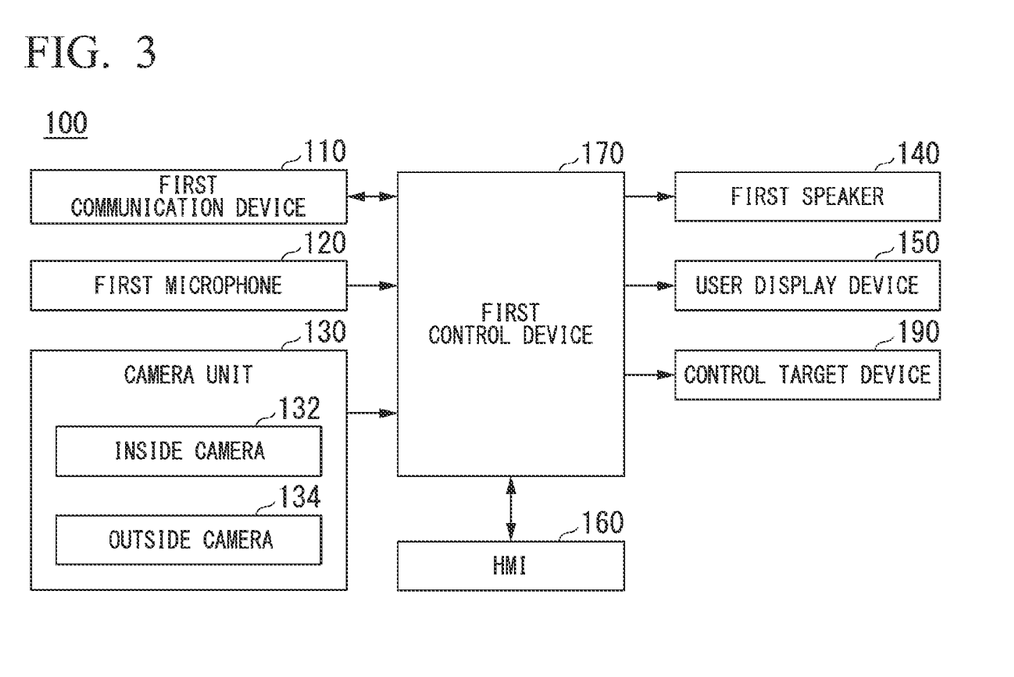
FIG. 3 is a diagram illustrating a configuration of a first device.

FIG. 3 is a diagram illustrating a configuration of the first device 100. The first device 100 includes, for example, a first communication device 110, a first microphone 120, a camera unit 130, a first speaker 140, a user display device 150, a human-machine interface (HMI) 160, and a first control device 170. The first control device 170 is connected to a control target device 190 mounted in the mobile object M.

The first communication device 110 is a communication interface that communicates with the communication device 310 of the management server 300 and a second communication device 210 of the second device 200 via the network NW.

The first microphone 120 collects at least voice uttered by the occupant P. The first microphone 120 is provided inside of the mobile object M and may have sensitivity with which voice outside of the mobile object M can also be collected, or may include a microphone provided inside of the mobile object M and a microphone provided outside of the mobile object M. For example, the voice collected by the first microphone 120 is transmitted from the first communication device 110 to the second communication device 210 via the first control device 170.

The camera unit 130 includes at least an inside camera 132 and may include an outside camera 134. The first speaker 140 outputs voice uttered by the user U and acquired via the first communication device 110. Details of arrangement or the like of the camera unit 130 and the first speaker 140 will be described later with reference to FIG. 4.

The user display device 150 virtually displays the user U as if the user U were present inside of the mobile object M. For example, the user display device 150 displays a hologram or displays the user U on a part corresponding to a mirror or a windshield of the mobile object M.

The HMI 160 is a touch panel or an audio response device (an agent device). The HMI 160 receives various instructions for the first device 100 from the occupant P.

The first control device 170 includes, for example, a processor such as a CPU and a storage medium connected to the processor and storing a program (an instruction group) and controls the constituent units of the first device 100 by causing the processor to execute the instruction group.

The control target device 190 includes, for example, a navigation device and a driving support device mounted in the mobile object M.

Figure 4:
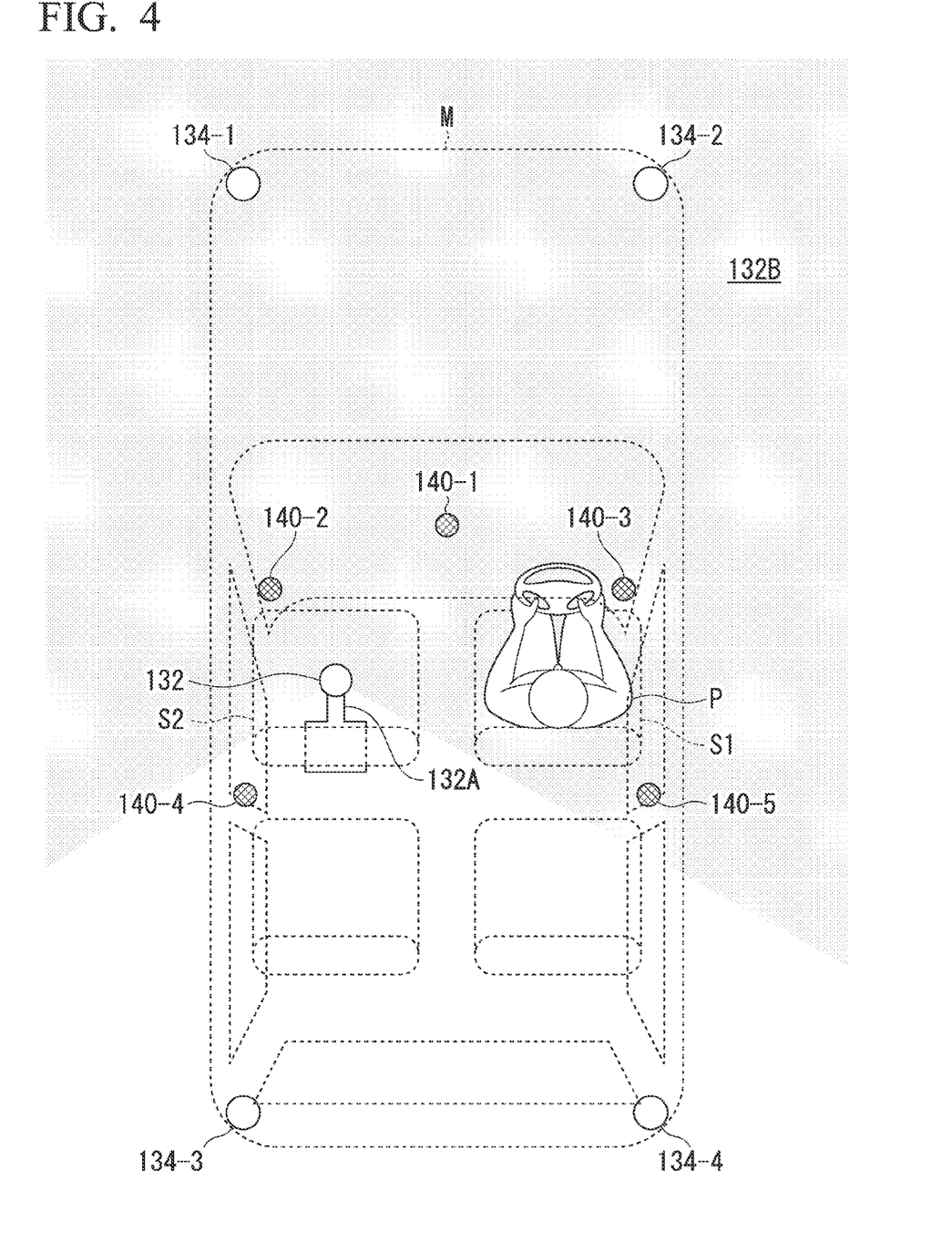
FIG. 4 is a diagram illustrating an arrangement example of a part of the first device in a mobile object.

FIG. 4 is a diagram illustrating an arrangement example of a part of the first device 100 in the mobile object M. For example, the inside camera 132 is attached to a neck pillow of a passenger's seat S2 (an example of a "predetermined seat") using an attachment 132A and is provided on a position which is slightly separated in a traveling direction of the mobile object M from a backrest of the passenger's seat S2. The inside camera 132 includes a wide-angle lens and can image a range indicated by a hatched area 132B in the drawing. The inside camera 132 can also image the outside via a windshield as well as the inside of the mobile object M. In the following description, it is assumed that the passenger's seat S2 is the predetermined seat, but the predetermined seat may be another seat such as a rear seat.

The outside camera 134 includes, for example, a plurality of sub outside cameras 134-1 to 134-4. By combining images captured by the plurality of sub outside cameras 134-1 to 134-4, an image such as a panoramic image of the outside view of the mobile object M is obtained. The outside camera 134 may include a wide-angle camera provided on the roof of the mobile object M instead thereof (or in addition thereto). A camera that can image a rear view of the passenger's seat S2 may be added as the inside camera 132, and a mobile-object image which will be described later may be generated as a 360-degree panoramic image by the first control device 170 by combining images captured by one or more inside camera 132 or may be generated as a 360-degree panoramic image by appropriately combining the images captured by the inside camera 132 and the image captured by the outside camera 134.

The first speaker 140 outputs voice of the user U acquired via the first communication device 110. The first speaker 140 includes, for example, a plurality of sub first speakers 140-1 to 140-5. For example, the sub first speaker 140-1 is provided at the center of an instrument panel, the sub first speaker 140-2 is provided at a left end of the instrument panel, the sub first speaker 140-3 is provided at a right end of the instrument panel, the sub first speaker 140-4 is provided in a lower part of a left door, and the sub first speaker 140-5 is provided in a lower part of a right door. When voice of the user U is output from the first speaker 140, the first control device 170 localizes a sound image such that the occupant P sitting on the driver's seat S1 hears sound from the passenger's seat S2, for example, by allowing the sub first speaker 140-2 and the sub first speaker 140-4 to output the voice of the user U with the same sound volume and turning off the other sub first speakers 140. The method of localizing a sound image is not limited to adjustment of a sound volume and may be performed by causing phases of sound output from the sub first speakers 140 to be different. For example, when a sound image is localized such as sound is heard from the left, a timing at which sound is output from the left sub first speaker can be set to be slightly earlier than a timing at which the same sound is output from the right sub first speaker.

When voice of the user U is output from the first speaker 140, the first control device 170 may localize a sound image such that the occupant P hears sound from a position of a height corresponding to the head height of the user U on the passenger's seat S2 and cause the first speaker 140 to output the voice uttered by the user U. In this case, the first speaker 140 needs to include a plurality of sub first speakers 140-$k$ (where k is a natural number of two or more) with different heights.

Figure 5:
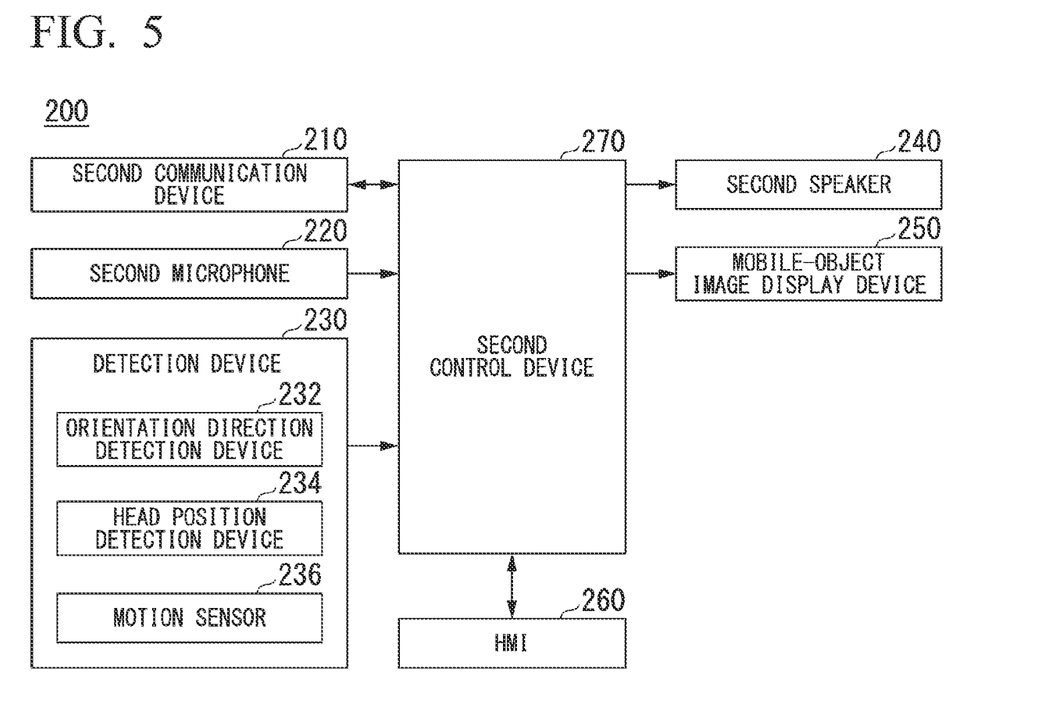
FIG. 5 is a diagram illustrating a configuration of a second device.

FIG. 5 is a diagram illustrating a configuration of the second device 200. The second device 200 includes, for example, a second communication device 210, a second microphone 220, a detection device 230, a second speaker 240, a mobile-object image display device 250, an HMI 260, and a second control device 270. The detection device 230 includes, for example, an orientation direction detection device 232, a head position detection device 234, and a motion sensor 236.

The second communication device 210 is a communication interface that communicates with the communication device 310 of the management server 300 and the first communication device 110 of the first device 100 via the network NW.

The second microphone 220 collects voice uttered by the user U. For example, the voice collected by the second microphone 220 is transmitted from the second communication device 210 to the first communication device 110 via the second control device 270.

The orientation direction detection device 232 is a device that detects an orientation direction. An orientation direction is a direction of a face or a direction of a sightline of the user U or a direction based on both. Alternatively, the orientation direction may be a direction indicated by a motion of an arm or a finger such as a motion of tilting a terminal device used by the user U or a motion of swiping a screen. In the following description, it is assumed that the orientation direction is an angle in a horizontal plane, that is, an angle not having a component in a vertical direction, but the orientation direction may be an angle having a component in the vertical direction. The orientation direction detection device 232 may include a physical sensor (for example, an acceleration sensor or a gyro sensor) attached to a VR goggle which will be described later or may be an infrared sensor that detects a plurality of positions of the head of the user U or a camera that images the head of the user U. In any case, the second control device 270 calculates the orientation direction on the basis of information input from the orientation direction detection device 232. Various techniques therefor are known and thus detailed description thereof will be omitted.

The head position detection device 234 is a device that detects a position (height) of the head of the user U. For example, one or more infrared sensors or optical sensors provided near a seat on which the user U sits are used as the head position detection device 234. In this case, the second control device 270 detects the position of the head of the user U on the basis of whether there is a detection signal from the one or more infrared sensors or optical sensors. The head position detection device 234 may be an acceleration sensor attached to the VR goggle. In this case, the second control device 270 detects the position of the head of the user U by integrating a value obtained by subtracting the gravitational acceleration from the output of the acceleration sensor. Information of the acquired position of the head is provided as height information to the second control device 270. The position of the head of the user may be acquired on the basis of an operation of the user U on the HMI 260. For example, the user U may input a body height in a numerical value to the HMI 260 or may input a body height using a dial switch included in the HMI 260. In this case, the position, that is, height information, of the head from the body height is calculated. The user U may input a discrete value of a physical constitution such as large/middle/small instead of a continuous value to the HMI 260. In this case, the height information is acquired on the basis of information indicating the physical constitution. Instead of particularly acquiring the height of the head of the user, the height of the head of the user U may be simply acquired on the basis of a physical constitution (for each of male and female) of a regular adult.

The motion sensor 236 is a device that recognizes a gesture operation which is performed by the user U. For example, a camera that images an upper half of the user U is used as the motion sensor 236. In this case, the second control device extracts feature points (such as a fingertip, a wrist, and an elbow) of the body of the user U from an image captured by the camera and recognizes the gesture operation of the user U on the basis of motions of the feature points.

The second speaker 240 outputs voice acquired via the second communication device 210 and uttered by the occupant P. The second speaker 240 has, for example, a function of changing a direction in which voice is heard. The second control device 270 causes the second speaker to output voice such that the user U hears voice from the position of the occupant P when seen from the passenger's seat S2. The second speaker 240 includes a plurality of sub second speakers 240-*n* (where n is a natural number of 2 or more). Sound image localization may be performed by causing the second control device 270 to adjust sound volumes of the sub second speakers 240-*n*, or sound image localization may be performed using a function of a headphone when the headphone is attached to a VR goggle.

Figure 6:
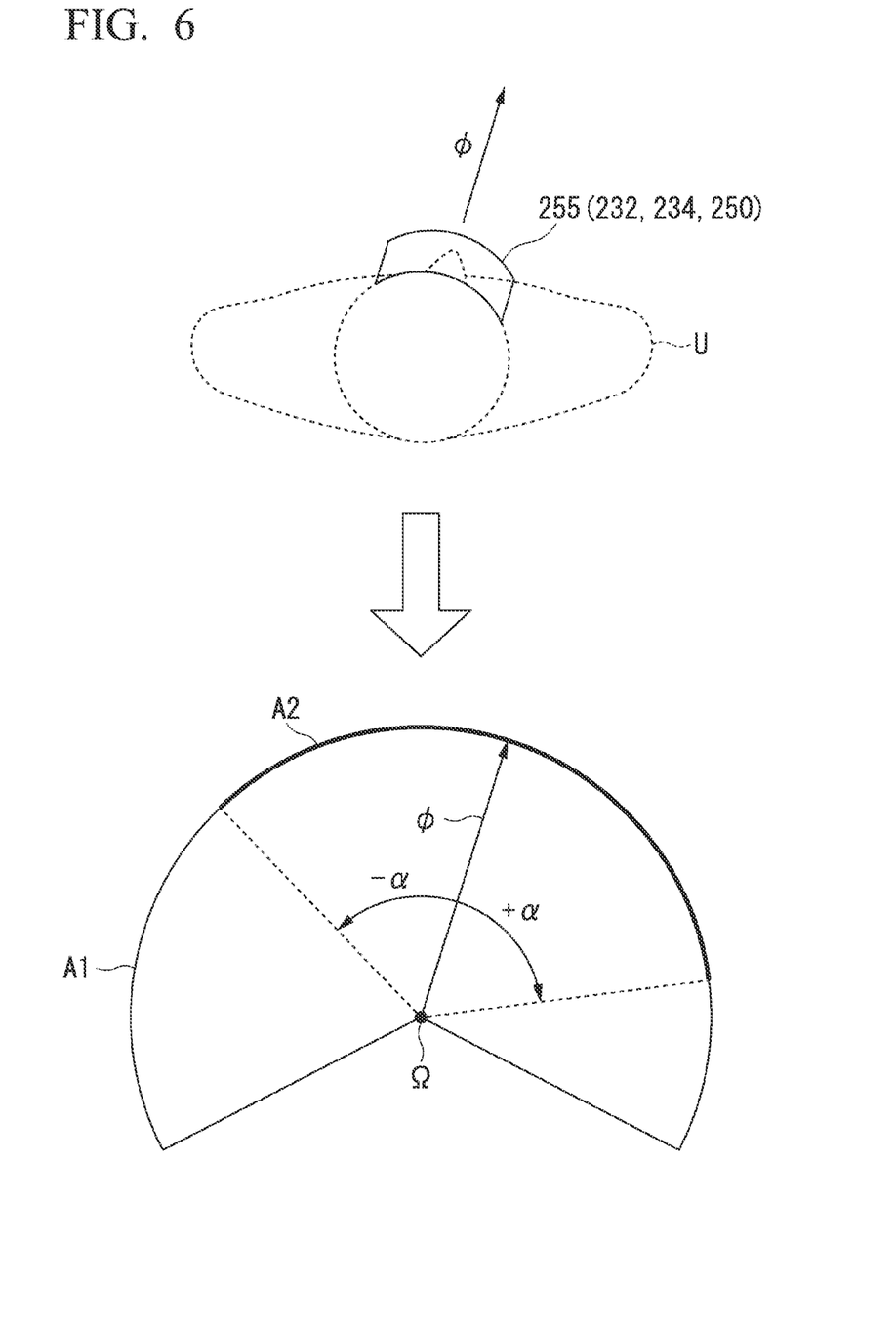
FIG. 6 is a diagram illustrating an image corresponding to an orientation direction.

The mobile-object image display device 250 displays an image corresponding to the orientation direction when seen from the passenger's seat out of images captured by the camera unit 130 (which may be images subjected to the combination process and which is referred to as a mobile-object image in the following description). FIG. 6 is a diagram illustrating an image corresponding to an orientation direction. In the example illustrated in the drawing, a VR goggle 255 includes a physical sensor serving as the orientation direction detection device 232 and the head position detection device 234 and the mobile-object image display device 250. The second control device 270 detects a direction which the VR goggle 255 faces as an orientation direction with a pre-calibrated direction as a reference direction. Various techniques for this function are known and detailed description thereof will be omitted.

The mobile-object image display device 250 displays an image A2 in an angle range of ±α with respect to the orientation direction φ in a mobile-object image A1 (which has an angle of about 240 degrees in the drawing, a viewing angle of which may be extended by the aforementioned combination process) to the user U.

The HMI 260 includes a touch panel, an audio response device (an agent device), or the aforementioned switches. The HMI 260 receives various instructions of the occupant P for the second device 200.

The second control device 270 includes, for example, a processor such as a CPU and a storage medium connected to the processor and storing a program (an instruction group) and controls the constituent units of the second device 200 by causing the processor to execute the instruction group.

Functional Configuration

The functional configurations of the first control device 170 and the second control device 270 will be described below.

First Example

Figure 7:
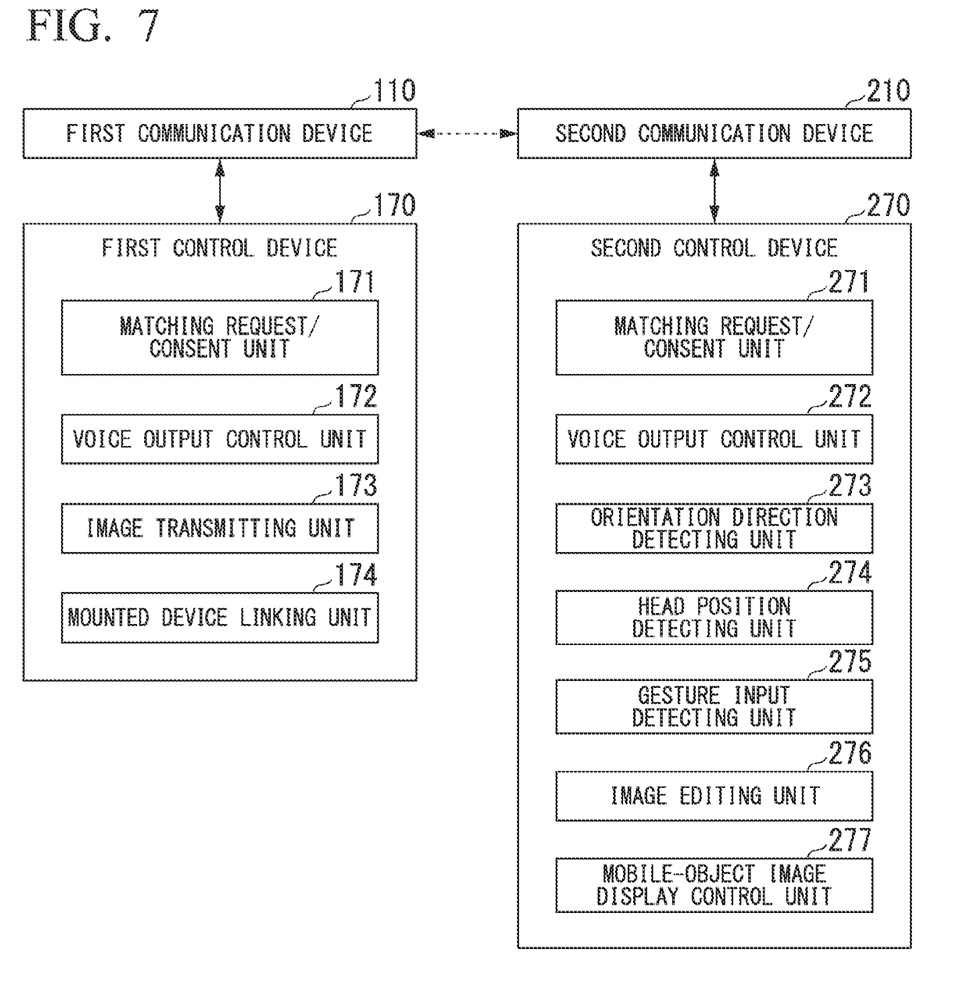
FIG. 7 is a diagram illustrating a first example of a functional configuration of a first control device and a second control device.

FIG. 7 is a diagram illustrating a first example of the functional configurations of the first control device 170 and the second control device 270. In the first example, the first control device 170 includes a matching request/consent unit 171, a voice output control unit 172, an image transmitting unit 173, and a mounted device linking unit 174. The second control device 270 includes a matching request/consent unit 271, a voice output control unit 272, an orientation direction detecting unit 273, a head position detecting unit 274, a gesture input detecting unit 275, an image editing unit 276, and a mobile-object image display control unit 277. These functional units are realized, for example, by causing a processor such as a CPU to execute a program (an instruction group). Some or all of these elements may be realized by hardware (a circuit part including circuitry) such as a large scale integration (LSI) device, an application-specific integrated circuit (ASIC), or a field-programmable gate array (FPGA), or a graphics processing unit (GPU) or may be cooperatively realized by software and hardware.

The matching request/consent unit 171 receives an input of a matching request from the occupant P using the HMI 160 and transmits the matching request to the management server 300 or receives an input of a consent to the matching request received from the management server 300 using the HMI 160 and transmits the consent to the management server 300. The matching request/consent unit 171 controls the first communication device 110 such that the second device 200 of the user U who has been matched is a communication partner.

The voice output control unit 172 controls the first speaker 140 as described above.

The image transmitting unit 173 transmits a mobile-object image A1 to the second device 200 using the first communication device 110.

The mounted device linking unit 174 controls the control target device 190 on the basis of an instruction signal input from the second device 200.

The matching request/consent unit 271 receives an input of a matching request from the user U using the HMI 260 and transmits the matching request to the management server 300 or receives an input of a consent to the matching request received from the management server 300 using the HMI 260 and transmits the consent to the management server 300. The matching request/consent unit 271 controls the second communication device 210 such that the first device 100 of the occupant P who has been matched is a communication partner.

The voice output control unit 272 controls the second speaker 240 as described above.

The orientation direction detecting unit 273 detects an orientation direction on the basis of an output of the orientation direction detection device 232. The head position detecting unit 274 detects a height of the head of the user U on the basis of an output of the head position detection device 234. The head position may be expressed by three-dimensional coordinates or the height of the head may be detected as the head position. The gesture input detecting unit 275 detects a gesture input of the user U on the basis of an output of the motion sensor 236.

The image editing unit 276 performs a process of cutting out an image A2 corresponding to the orientation direction when seen from the passenger's seat from the mobile-object image A1 (FIG. 6). The mobile-object image display control unit 277 causes the mobile-object image display device 250 to display the image A2 cut out by the image editing unit 276. At this time, the image editing unit 276 may cause the mobile-object image display device 250 to display an image corresponding to the orientation direction when seen from the height indicated by the height information of the head of the user U.

Second Example

Figure 8:
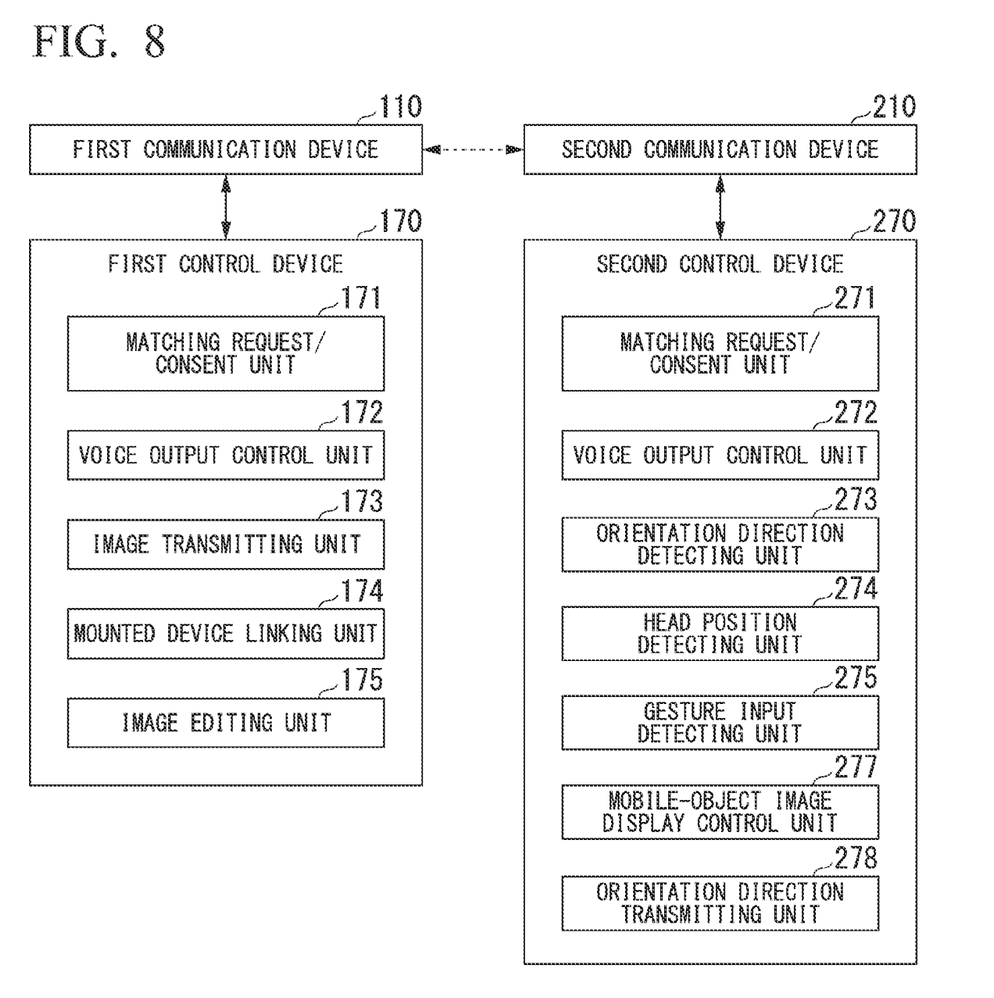
FIG. 8 is a diagram illustrating a second example of the functional configuration of the first control device and the second control device.

FIG. 8 is a diagram illustrating a second example of the functional configurations of the first control device 170 and the second control device 270. The second example is different from the first example illustrated in FIG. 7, in that the first control device 170 includes an image editing unit 175 and the second control device 270 does not include the image editing unit 276 and includes an orientation direction transmitting unit 278. The other elements basically have the same functions as in the first example and thus repeated description thereof will be omitted.

The orientation direction transmitting unit 278 transmits the orientation direction ϕ detected by the orientation direction detecting unit 273 to the first device 100 using the second communication device 210.

The image editing unit 175 performs a process of cutting out an image A2 corresponding to an orientation direction (transmitted from the second device 200) when seen from the passenger's seat from the mobile-object image A1 (FIG. 6). At this time, the image editing unit 175 may acquire height information of the head of the user U from the second device 200 and may perform a process of cutting out the image A2 corresponding to the orientation direction when seen from the height indicated by the height information.

The image transmitting unit 173 in the second example transmits the image A2 cut out by the image editing unit 175 to the second device 200 using the first communication device 110. Then, the mobile-object image display control unit 277 causes the mobile-object image display device 250 to display the image A2 transmitted from the first device 100.

Sharing of Sight Area

In this way, a user U can freely view an image corresponding to an orientation direction (hereinafter also referred to as an "orientation image") when seen from a passenger's seat out of images captured by the camera unit 130 using the mobile-object image display device 250. For example, the user U can also ascertain appearance of an occupant P by seeing the right side from the position of the passenger's seat. However, viewing of an image by the user U may cause an occupant P to feel an unpleasant feeling or a sense of incompatability. For example, the occupant P may not ascertain to what direction the user U is directed from the position of the passenger's seat and feel uncomfortable. For example, the occupant P needs to have a sightline directed forward while driving the mobile object M, but may want to ascertain an area other than an area in front of the mobile object M in some cases. In this case, when the user U puts the sightline on the area instead of the occupant P and shares an image including the area on which the sightline is put by the occupant P via the HMI 160, it is convenient to the occupant P. In consideration of these circumstances, the second device 200 according to this embodiment transmits a sight area of the user U in the orientation image to the first device 100, and the first device 100 displays the received sight area of the user U in a predetermined mode on the HMI 160 as will be described later.

Figure 9:
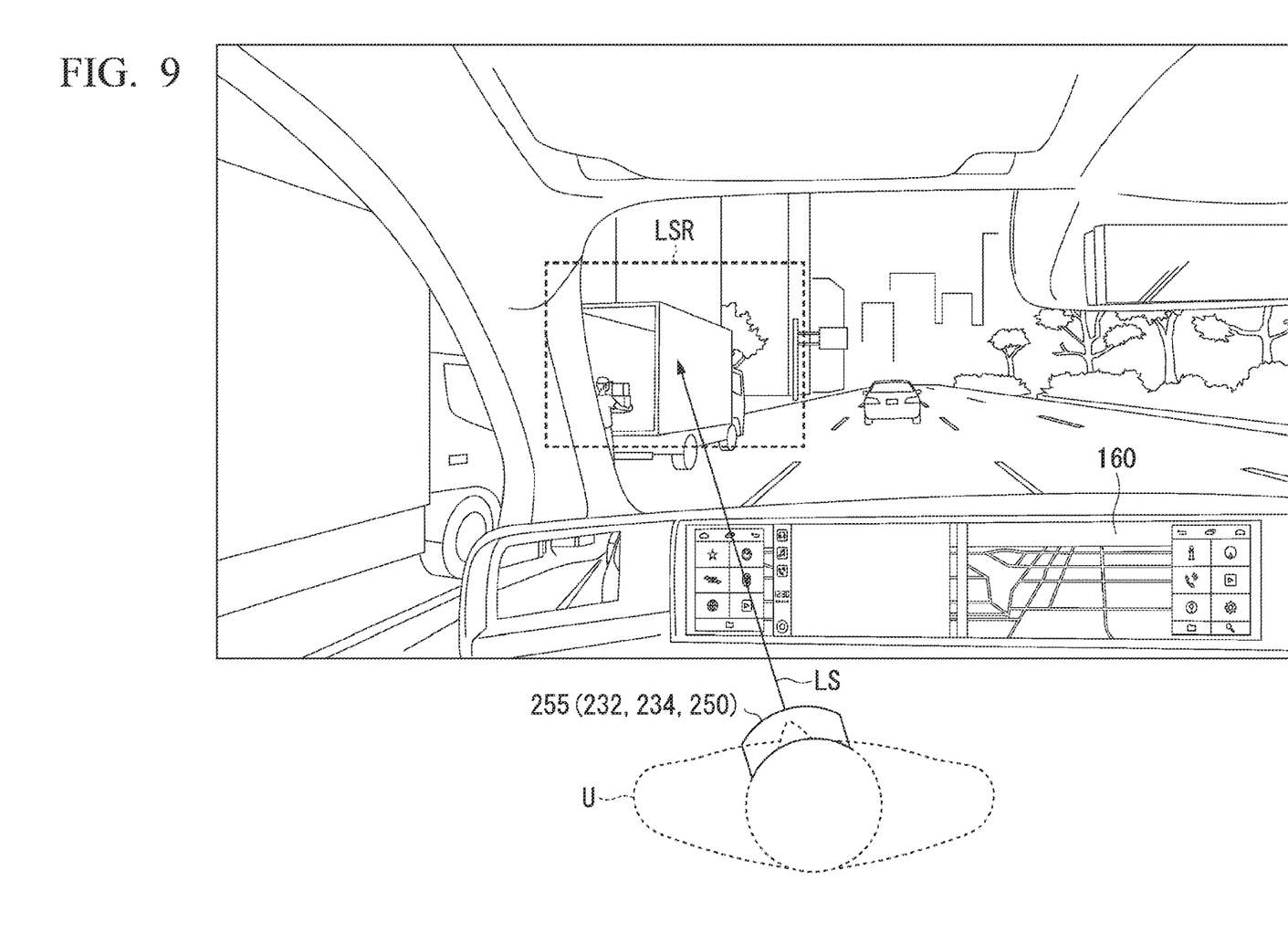
FIG. 9 is a diagram illustrating an example of a sight area of a user U in an image corresponding to an orientation direction.

FIG. 9 is a diagram illustrating an example of a sight area of a user U in an image corresponding to an orientation direction. In FIG. 9, reference sign LS denotes a sightline of the user U detected by the orientation direction detection device 232, and reference sign LSR denotes a sight area of the user U. The second device 200 cuts out an area in a predetermined range from the sightline of the user U detected by the orientation direction detection device 232 from the orientation image and identifies the cut-out area as the sight area LSR of the user U. The second communication device 210 transmits the identified sight area LSR to the first communication device 110. The sight area LSR has only to be identified as at least a partial area of the orientation image, and the second communication device 210 may identify the whole orientation image as the sight area of the user U on the basis of the assumption that the user U puts the sightline on the whole orientation image.

Figure 10:
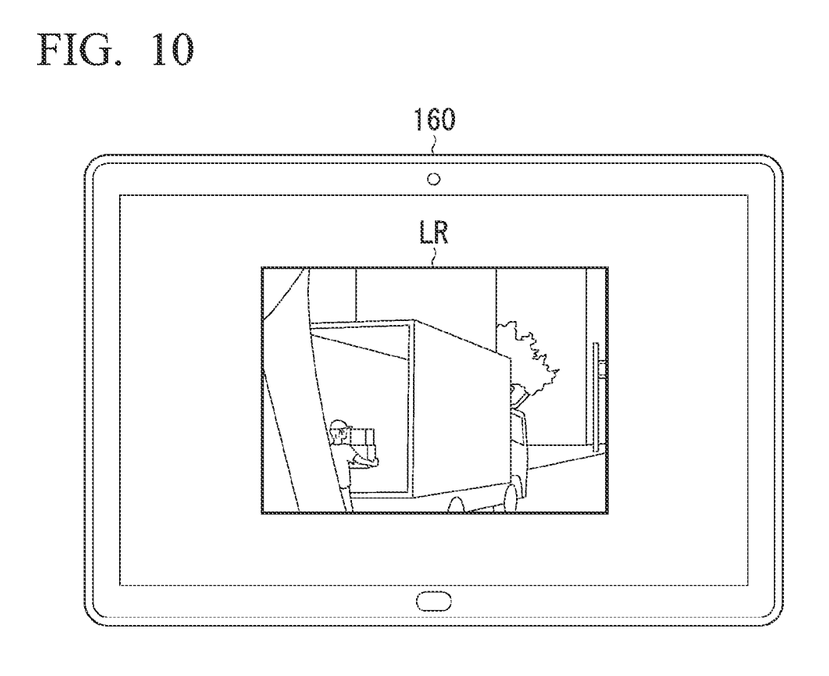
FIG. 10 is a diagram illustrating an example of a display mode of a sight area.

When the sight area LSR is received via the first communication device 110, the first device 100 displays the received sight area LSR in a predetermined mode on the HMI 160. FIG. 10 is a diagram illustrating an example of a display mode of the sight area LSR. In the mode illustrated in FIG. 10, the first device 100 displays the received sight area LSR on the HMI 160 without any change. Accordingly, the occupant P can ascertain the sight area of the user U and use the sight area for driving the mobile object M.

Figure 11:
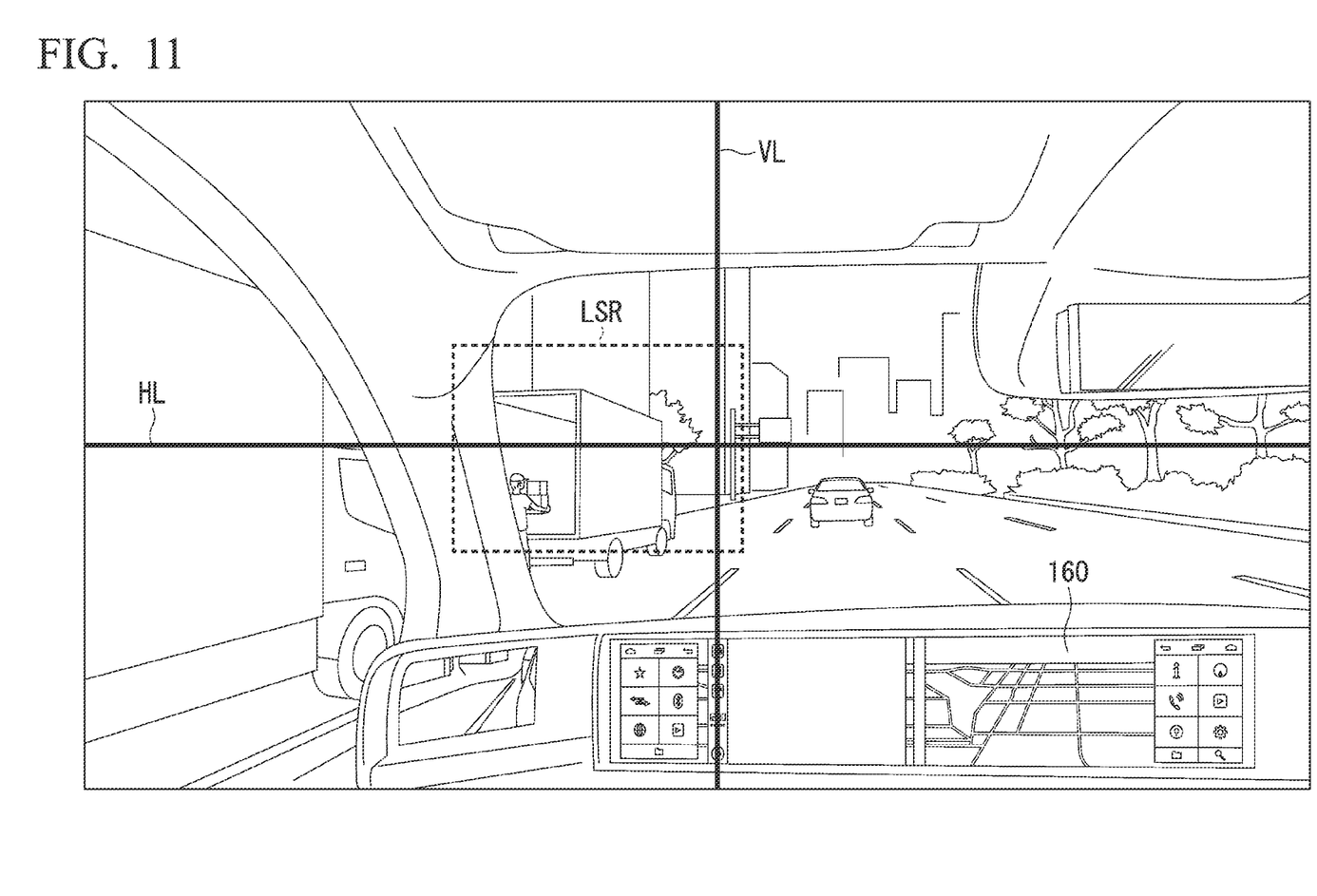
FIG. 11 is a diagram illustrating an example of a method of identifying a direction of a sight area in an orientation image.

In another mode, the first device 100 may identify a direction of the sight area LSR in the orientation image without displaying the sight area LSR on the HMI 160 and display information indicating the identified direction on the HMI 160. FIG. 11 is a diagram illustrating an example of a method of identifying a direction of a sight area LSR in an orientation image. For example, the first device 100 sets a center line VL in a vertical direction and a center line HL in a horizontal direction in the orientation image and calculates overlapping areas of the sight area LSR with a left area of the center line VL in the orientation image, a right area of the center line VL, an upper area of the center line HL, and a lower area of the center line HL. The first device 100 identifies a direction of an area with the largest areas out of the left area, the right area, the upper area, and the lower area as a direction of the sight area LSR. In FIG. 11, the first device 100 determines that the overlapping area of the left area of the center line VL with the sight area LSR is the largest and identifies that the direction of the sight area LSR is leftward.

In this embodiment, the first device 100 identifies the direction of the sight area LSR on the basis of the received sight area LSR, but the second device 200 may approximately identify the direction of the sight area LSR and transmit information of the identified direction to the first device 100.

Figure 12:
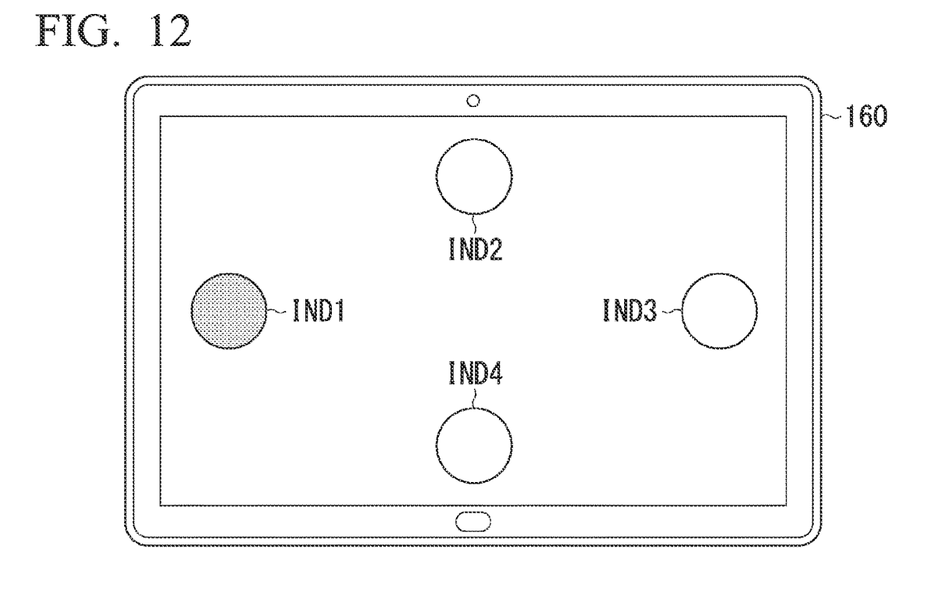
FIG. 12 is a diagram illustrating another example of the display mode of a sight area.

FIG. 12 is a diagram illustrating another example of the display mode of the sight area LSR. In FIG. 12, reference signs IND1 to IND4 denote indicators emitting light on the HMI 160 (software indicators) under the control of the first device 100. When the direction of the sight area LSR is identified as being leftward in the situation illustrated in FIG. 11, the first device 100 causes the indicator ID1 corresponding to the leftward to emit light on the HMI 160. Accordingly, the occupant P can ascertain the sightline of the user U using only a space smaller than the HMI 160 in comparison with the mode in which the sight area LSR is displayed.

In this embodiment, the first device 100 identifies one of four directions of leftward, rightward, upward, and downward as the direction of the sight area LSR, but the present invention is not limited to such a configuration and the direction of the sight area LSR may be identified more finely (or coarsely). For example, the first device 100 may identify one of leftward and rightward as the direction of the sight area LSR. In this embodiment, the first device 100 causes a software indicator to emit light on the HMI 160, but the present invention is not limited to such a configuration and may employ a hardware indicator such as an LED light. Alternatively, hardware indicators such as a plurality of LED lights may be provided at constant intervals from one end to the other end of a vehicle in a width direction of the vehicle and the indicator in the direction corresponding to the sight area LSR may be caused to emit light. Alternatively, when an onboard device such as a meter or a lamp is provided at a position corresponding to the sight area LSR, the onboard device may be caused to emit light in a predetermined mode. Alternatively, an object (which may be a seat or an instrument panel) in the corresponding direction may be irradiated with light from a light source such as a light such that the direction corresponding to the sight area LSR is illuminated.

As described above, the first device 100 in this embodiment includes a mode in which a sight area LSR is displayed on the HMI 160 and a mode in which an indicator corresponding to the direction of the sight area LSR is turned on. What of the two modes is to be performed can be set, for example, by allowing the occupant P to operate the HMI 160. For example, the first device 100 may switch between the two modes on the basis of whether a predetermined condition has been satisfied. A third mode in which the sight area LSR is not displayed may be further provided.

Figure 13:
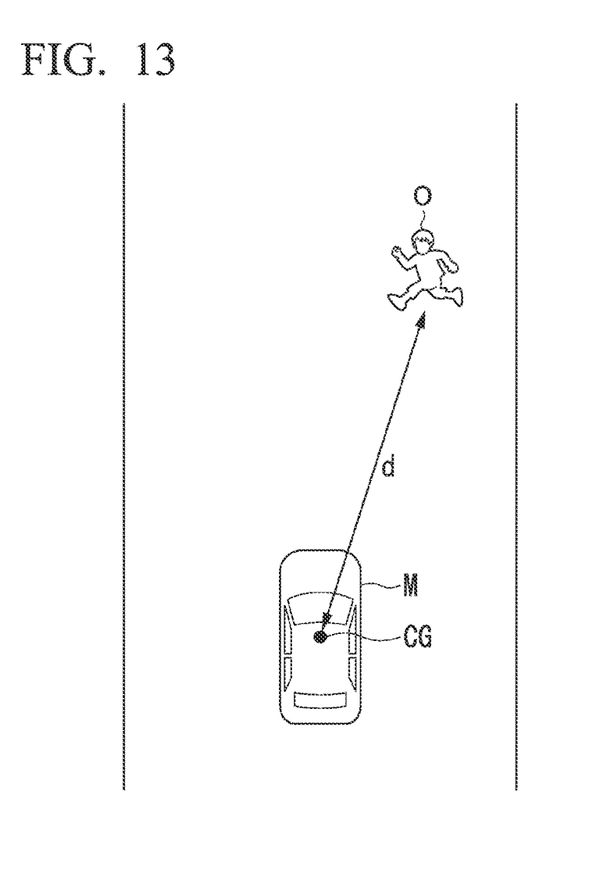
FIG. 13 is a diagram illustrating an example of a predetermined condition for switching the display mode of a sight area.

FIG. 13 is a diagram illustrating an example of a predetermined condition for switching the display mode of a sight area LSR. As illustrated in FIG. 13, for example, the first device 100 determines whether an object O is present within a predetermined distance d from the mobile object M on the basis of an image representing a surrounding situation of the mobile object M and being captured by the outside camera 134. When it is determined that an object O is present within the predetermined distance d from the mobile object M, the first device 100 sets the mode in which the sight area LSR is displayed on the HMI 160.

For example, the first device 100 may set the mode in which the sight area LSR is displayed on the HMI 160 when it is determined on the basis of a captured image that there is an object O approaching the mobile object M at a predetermined acceleration or higher. For example, the first device 100 may set the mode in which the sight area LSR is displayed on the HMI 160 when it is determined on the basis of a captured image that a specific type of vehicle (for example, an emergency vehicle such as an ambulance car) is present within the predetermined distance d from the mobile object M. Accordingly, the occupant P can ascertain the surrounding situation of the mobile object M with reference to the sight area LSR on which the sightline of the user U is put and use the ascertained surrounding situation for driving the mobile object M.

Others

In the information processing system 1, the user U can view an arbitrary direction when seen from the passenger's seat S2, but limitation may be provided in a direction in which the user U can see, for example, by agreement at the time of matching. For example, there may be demand for the occupant P side for providing a view in the traveling direction of the mobile object M or a view on the opposite side of the driver's seat S1 but not displaying the occupant's appearance. This is on the basis of the assumption that the occupant P and the user U do not have a relationship of family members or friends and a request for ascertaining a driving feeling of the mobile object M or seeing a view of a desired street is responded to. In this case, such limitation is set when the matching processing unit 320 of the management server 300 performs a matching process, and the first control device 170 or the second control device 270 masks an angle range which is not to be seen or performs correction according to the settings such that the orientation direction does not face the limited direction. Information on this limitation is associated with privacy of the occupant P and thus may be set by the first device 100 side.

Conclusion

With the information processing system 1 having the aforementioned configuration, it is possible to enhance a sense of realism which is given to both an occupant P in a mobile object M and a user located at a place different from the mobile object M. An image corresponding to an orientation direction of the user when seen from a passenger's seat is displayed to the user U, and information on a sight area to which a sightline of the user U is directed in the displayed image is shared by the occupant P. Accordingly, the occupant P can ascertain the sightline of the user U and utilize the information on the sight area for driving.

Use Mode

The information processing system 1 can be used in the following manners.

(A) A manner in which an occupant P and a user U have a relationship of family members, friends, or the like and virtual driving is provided to the user U. The user U can make a conversation with the occupant P about a scenery near the mobile object M while seeing an image.

(B) A manner in which an occupant P is a general user and a user U is a provider of a route guidance service, a driving training service, or the like. The user U can perform route guidance or training of a driving operation in a place which it is difficult to understand using a navigation device or which does not appear on a map while seeing a scenery near the mobile object M.

(C) A manner in which an occupant P is a celebrity, a user U is a general user, and commercially based virtual driving is provided to the user U. In this case, a plurality of users U may be together correlated with one occupant P, and, for example, transmission of voice from the users U may be set to an off state.

While exemplary embodiments of the present invention have been described above, the present invention is not limited to the embodiments and can be subjected to various modifications and substitutions without departing from the gist of the present invention.

What is claimed is:

1. An information processing system comprising:
a first device that is mounted in a mobile object which an occupant boards; and a second device that is used by a user at a place different from the mobile object,
wherein the first device includes:

a first communication device configured to communicate with a second communication device of the second device; and a camera unit including one or more cameras including at least an inside camera that is provided on a predetermined seat of the mobile object and images the inside of the mobile object when seen from the predetermined seat, wherein the second device includes:

the second communication device configured to communicate with the first communication device;

a detection device configured to detect an orientation direction of the user; and a display device configured to display an image corresponding to the orientation direction when seen from the predetermined seat out of images captured by the camera unit, wherein the second device identifies a sight area to which a sightline of the user is directed in the image, wherein the second communication device transmits the identified sight area to the first communication device, wherein the first device displays the sight area received via the first communication device in a predetermined mode on a display device, wherein the display device of the first device includes a plurality of indicators, and wherein the first device turns on at least one of the plurality of indicators corresponding to a direction of the sight area in the image as the predetermined mode.

2. The information processing system according to claim 1, wherein the display device of the first device includes a display, and wherein the first device displays the sight area on the display as the predetermined mode.

3. The information processing system according to claim 1, wherein the display device of the first device includes a plurality of indicators and a display, and wherein the first device switches the predetermined mode between a mode in which at least one of the plurality of indicators corresponding to a direction of the sight area in the image is turned on and a mode in which the sight area is displayed on the display according to the occupant's operation.

4. The information processing system according to claim 1, wherein the display device of the first device includes a plurality of indicators and a display, and wherein the first device switches the predetermined mode between a mode in which at least one of the plurality of indicators corresponding to a direction of the sight area in the image is turned on and a mode in which the sight area is displayed on the display on the basis of a predetermined condition.

5. The information processing system according to claim 4, wherein the predetermined condition is that an object is present within a predetermined distance from the mobile object, and wherein the first device sets the predetermined mode to the mode in which the sight area is displayed on the display when the predetermined condition has been satisfied.

6. The information processing system according to claim 1, wherein the second communication device transmits information of the orientation direction to the first communication device, wherein the first device further includes a first control device configured to control the first communication device such that an image corresponding to the orientation direction acquired via the first communication device out of images captured by the camera unit is selectively transmitted to the second communication device, and wherein the display device of the second device displays an image corresponding to the orientation direction when seen from the predetermined seat and acquired via the second communication device.

7. The information processing system according to claim 1, wherein the first communication device transmits images captured by the camera unit to the second communication device, and wherein the second device further includes a second control device configured to selectively display an image corresponding to the orientation direction out of the images captured by the camera unit on the display device.

8. The information processing system according to claim 1, wherein the display device is a display device of a virtual reality (VR) goggle, and wherein the detection device includes a physical sensor attached to the VR goggle.

9. The information processing system according to claim 1, wherein the mobile object is a vehicle, and wherein the predetermined seat is a passenger's seat.

* * * * *